(12) United States Patent
Qiu

(10) Patent No.: US 11,251,966 B2
(45) Date of Patent: *Feb. 15, 2022

(54) SENDING CROSS-CHAIN AUTHENTICATABLE MESSAGES

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/786,949

(22) Filed: Feb. 10, 2020

(65) Prior Publication Data

US 2020/0177391 A1 Jun. 4, 2020

Related U.S. Application Data

(63) Continuation of application No. PCT/CN2020/071367, filed on Jan. 10, 2020.

(30) Foreign Application Priority Data

Jun. 28, 2019 (CN) .......................... 201910579570.3

(51) Int. Cl.
*H04L 29/00* (2006.01)
*H04L 9/32* (2006.01)
(Continued)

(52) U.S. Cl.
CPC .......... *H04L 9/3239* (2013.01); *H04L 9/0637* (2013.01); *H04L 9/3242* (2013.01);
(Continued)

(58) Field of Classification Search
CPC . H04L 2209/38; H04L 9/3247; H04L 9/0637; H04L 9/3236; H04L 2209/56;
(Continued)

(56) References Cited

U.S. PATENT DOCUMENTS 10,298,585 B1  5/2019 Treat et al.
10,419,209 B1  9/2019 Griffin et al.
(Continued)

FOREIGN PATENT DOCUMENTS

CN  107301536  10/2017
CN  107424073  12/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ghazal B Shehni
(74) *Attorney, Agent, or Firm* — Fish & Richardson P.C.

(57) ABSTRACT

Disclosed herein are computer-implemented methods; computer-implemented systems; and non-transitory, computer-readable media, for sending cross-chain messages. One computer-implemented method includes storing, through consensus of blockchain nodes of a first blockchain network, an authenticable message (AM) associated with a first account to a blockchain associated with the first blockchain network, where the AM comprises an identifier of the first blockchain network, information of the first account, information of a recipient of the AM, and content of the AM. The AM and location information is transmitted to a relay to be forwarded to the recipient located outside of the first blockchain network, where the location information identifies a location of the AM in the blockchain and the recipient includes one or more accounts outside of the first blockchain network.

30 Claims, 10 Drawing Sheets

(51) Int. Cl.
  *H04L 9/06* (2006.01)
  *H04L 29/06* (2006.01)
  *H04L 29/08* (2006.01)

(52) U.S. Cl.
  CPC .......... *H04L 63/123* (2013.01); *H04L 63/126* (2013.01); *H04L 67/10* (2013.01); *H04L 2209/38* (2013.01)

(58) Field of Classification Search
  CPC ..... H04L 9/3239; H04L 9/3242; H04L 67/10; H04L 63/123; H04L 63/126; H04L 2209/34
  See application file for complete search history.

(56) References Cited

U.S. PATENT DOCUMENTS

| | | | |
|---|---|---|---|
| 11,088,854 B2* | 8/2021 | El Abed | G06Q 20/223 |
| 2016/0019148 A1* | 1/2016 | Vekiarides | G06F 12/0897 711/122 |
| 2016/0330034 A1 | 11/2016 | Back et al. | |
| 2017/0132419 A1 | 5/2017 | Gupta | |
| 2017/0352027 A1 | 12/2017 | Zhang et al. | |
| 2018/0137507 A1 | 5/2018 | Jayachandran et al. | |
| 2018/0373776 A1* | 12/2018 | Madisetti | H04L 9/3234 |
| 2019/0013948 A1* | 1/2019 | Mercuri et al. | G06F 11/3072 |
| 2019/0018887 A1 | 1/2019 | Madisetti et al. | |
| 2019/0019367 A1 | 1/2019 | Unagami et al. | |
| 2019/0028277 A1 | 1/2019 | Jayachandran et al. | |
| 2019/0058581 A1 | 2/2019 | Wood et al. | |
| 2019/0081793 A1 | 3/2019 | Martino et al. | |
| 2019/0130399 A1 | 5/2019 | Wright et al. | |
| 2019/0158594 A1 | 5/2019 | Shadmon et al. | |
| 2019/0188657 A1 | 6/2019 | Arora et al. | |
| 2019/0188787 A1 | 6/2019 | Besanson et al. | |
| 2019/0207762 A1 | 7/2019 | Xie et al. | |
| 2019/0220813 A1 | 7/2019 | Madisetti et al. | |
| 2019/0228409 A1 | 7/2019 | Madisetti et al. | |
| 2019/0238327 A1 | 8/2019 | Li et al. | |
| 2019/0289068 A1 | 9/2019 | Ma et al. | |
| 2019/0303888 A1 | 10/2019 | Hamasni et al. | |
| 2019/0311337 A1 | 10/2019 | Madisetti et al. | |
| 2019/0311357 A1 | 10/2019 | Madisetti et al. | |
| 2019/0327080 A1 | 10/2019 | Liu et al. | |
| 2019/0340266 A1 | 11/2019 | Vo et al. | |
| 2019/0340267 A1 | 11/2019 | Vo et al. | |
| 2019/0370792 A1 | 12/2019 | Lam | |
| 2019/0385156 A1 | 12/2019 | Liu | |
| 2020/0036514 A1 | 1/2020 | Christensen et al. | |
| 2020/0036712 A1 | 1/2020 | Soundararajan et al. | |
| 2020/0104296 A1 | 4/2020 | Hunn et al. | |
| 2020/0120019 A1 | 4/2020 | Chen et al. | |
| 2020/0177572 A1 | 6/2020 | Qiu | |
| 2020/0219093 A1 | 7/2020 | Malhotra et al. | |
| 2020/0252206 A1 | 8/2020 | Yeung et al. | |
| 2020/0278958 A1 | 9/2020 | Zhang et al. | |
| 2020/0296082 A1* | 9/2020 | Killoran, Jr. | H04L 63/08 |
| 2020/0327616 A1 | 10/2020 | Burke et al. | |
| 2020/0364188 A1 | 11/2020 | Hintermeister et al. | |
| 2020/0389294 A1 | 12/2020 | Soundararajan et al. | |
| 2021/0135848 A1 | 5/2021 | Li et al. | |
| 2021/0142318 A1 | 5/2021 | Qian et al. | |
| 2021/0150065 A1 | 5/2021 | Qiu | |
| 2021/0152365 A1 | 5/2021 | Nosseir et al. | |
| 2021/0158340 A1 | 5/2021 | Yang | |
| 2021/0160053 A1 | 5/2021 | Yang | |
| 2021/0167970 A1 | 6/2021 | Li et al. | |
| 2021/0184837 A1 | 6/2021 | Yang | |
| 2021/0201257 A1 | 7/2021 | Mohamed | |
| 2021/0203482 A1 | 7/2021 | Li et al. | |
| 2021/0209614 A1 | 7/2021 | Bakalis et al. | |
| 2021/0233071 A1 | 7/2021 | Wright et al. | |
| 2021/0263504 A1 | 8/2021 | Hogif et al. | |
| 2021/0266163 A1 | 8/2021 | Zeng et al. | |
| 2021/0278823 A1 | 9/2021 | Sauer et al. | |
| 2021/0281428 A1 | 9/2021 | Kempf et al. | |
| 2021/0312444 A1 | 10/2021 | Liu | |
| 2021/0326328 A1 | 10/2021 | Yang | |
| 2021/0326813 A1 | 10/2021 | Wang et al. | |

FOREIGN PATENT DOCUMENTS

| | | |
|---|---|---|
| CN | 108009811 | 5/2018 |
| CN | 108269190 | 7/2018 |
| CN | 108389129 | 8/2018 |
| CN | 108573016 | 9/2018 |
| CN | 108683630 | 10/2018 |
| CN | 108712257 | 10/2018 |
| CN | 108810137 | 11/2018 |
| CN | 109035012 | 12/2018 |
| CN | 109063016 | 12/2018 |
| CN | 109146677 | 1/2019 |
| CN | 109150943 | 1/2019 |
| CN | 109600367 | 4/2019 |
| CN | 109784881 | 5/2019 |
| CN | 109815657 | 5/2019 |
| CN | 110311790 | 10/2019 |
| CN | 110430162 | 11/2019 |
| CN | 110430235 | 11/2019 |
| CN | 110443704 | 11/2019 |
| TW | 201822088 | 6/2019 |
| TW | I663865 | 6/2019 |
| WO | WO 2019072272 | 4/2019 |

OTHER PUBLICATIONS

Nakamoto, "Bitcoin: A Peer-to-Peer Electronic Cash System," www.bitcoin.org, 2005, 9 pages.
U.S. Appl. No. 16/786,437, Qiu, filed Feb. 10, 2020.
U.S. Appl. No. 16/786,807, Qiu, filed Feb. 10, 2020.
PCT International Search Report and Written Opinion in PCT Appln No. PCT/CN2020/071555, dated Mar. 19, 2020, 13 pages (with partial English translation).
PCT International Search Report and Written Opinion in PCT Appln No. PCT/CN2020/071367, dated Mar. 31, 2020, 17 pages (with English translation).
PCT International Search Report and Written Opinion in PCT Appln No. PCT/CN2020/071574, dated Apr. 13 2020, 14 pages (with partial English translation).
Jin, "Towards a Novel Architecture for Enabling Interoperability Amongst Multiple Blockchains", 38th International Conference on Distributed Computing Systems (ICDCS), IEEE, Jul. 2-6, 2018, pp. 1203-1211.
Wang, "ReviewChain: Smart contract based review system with multi-blockchain gateway", International Conference on iThings, GreenConn, CPSConn, and SmartData, IEEE, Jul. 30-Aug. 3, 2018, pp. 1521-1526.
Zheng, "MicrothingsChain: Edge Computing and Decentralized IoT Architecture Based on Blockchain for Cross-domain Data Shareing", International Conference on Networking and Network Applications (NaNA), IEEE, Oct. 12-15, 2018, pp. 350-355.

* cited by examiner

US 11,251,966 B2

1

SENDING CROSS-CHAIN AUTHENTICATABLE MESSAGES

CROSS-REFERENCE TO RELATED APPLICATIONS

This application is a continuation of PCT Application No. PCT/CN2020/071367, filed on Jan. 10, 2020, which claims priority to Chinese Patent Application No. 201910579570.3, filed on Jun. 28, 2019, and each application is hereby incorporated by reference in its entirety.

TECHNICAL FIELD

Implementations of the present specification relate to the field of blockchain technologies, and more specifically, to a method and a device for sending a cross-chain authenticatable message.

BACKGROUND

A blockchain technology, also known as a distributed ledger technology, is a decentralized or distributed database technology. The blockchain technology has features such as decentralization, openness and transparency, tamper-resistance, and trustworthiness. Data in a blockchain network is broadcast to blockchain nodes in an entire network, each blockchain node has complete and consistent data. As the blockchain technology becomes increasingly popular, different types of blockchain networks have emerged and have been applied to fields such as finance, healthcare, supply blockchain network, asset management, and backtracing. However, most of applications on the blockchain network (cryptocurrency or smart contract) cannot be applied beyond the boundary of a particular blockchain network, and cannot cooperate with other blockchain networks to implement value exchanges, which affects functions of the blockchain network. How to enable different types of blockchain networks to cooperate to implement value exchange has become a direction of exploration. Currently, many cross-chain technologies have emerged. However, different cross-chain technologies have different unique designs and are applied to different scenarios. For different cross-chain scenarios, one blockchain network may need to be connected to various cross-chain platforms.

As such, a solution for more effective sending of cross-chain information is needed.

SUMMARY

Implementations of the present specification are intended to provide a solution for more effective sending of a cross-chain authenticatable message, to alleviate disadvantages in an existing technology.

To achieve the previous objective, an aspect of the present specification provides a method for sending a cross-chain authenticatable message, where sending a cross-chain authenticatable message refers to sending the authenticatable message from a first account in a first blockchain network to the outside, the first blockchain network is connected to the relay, and the method is performed by the first blockchain network and includes: storing first data through consensus into the first blockchain network by using the first account, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; and providing the first data and first location information to the relay, to provide the authenticatable message to the receiving object, where the first location information indicates a location of the first data in the first blockchain network, and the relay is connected to a system in which the receiving object is located.

In an implementation, storing first data through consensus into the first blockchain network by using the first account includes: storing the first data into the first blockchain network by invoking a first smart contract by using the first account, where at least the following parameters are input to the first smart contract when the first smart contract is invoked by using the first account: the receiving object information and the message content.

In an implementation, the first data is labeled with a pre-determined label.

In an implementation, the first data is a receipt, and the receipt includes a log generated after the first smart contract is executed, and a data field of the log is the authenticatable message.

In an implementation, the first data is labeled with a pre-determined label, and the pre-determined label is the pre-determined topic.

In an implementation, the pre-determined label is an account identifier of the first smart contract.

In an implementation, the authenticatable message further includes a protocol version number field and a reserved field.

In an implementation, the authenticatable message further includes a type field used to indicate a usage scenario type of the authenticatable message.

In an implementation, the type is any one of the following types: message type, remote procedure call type, and issuance/subscription type.

In an implementation, the authenticatable message further includes a sequence number field used to indicate a current sending sequence number when the authenticatable message is sent to a same receiving object for a plurality of times by using the first account.

In an implementation, the first account is a contract account of a second smart contract.

In an implementation, the relay is further connected to a second blockchain network, and the receiving object information includes a receiving blockchain identifier and a receiving account that respectively correspond to an identifier of the second blockchain network and a second account in the second blockchain network.

Another aspect of the present specification provides a method for relaying a cross-chain authenticatable message, where the method is performed by a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; and the method includes: obtaining the first data and first location information from the first blockchain network, where the first location information indicates a location of the first data in the first blockchain network; and sending, based on the receiving object information in the authenticatable information, the first data and the first location information to a system in which a receiving object is located, where the relay is connected to the system.

In an implementation, the first data is labeled with a pre-determined label, and obtaining the first data and first location information from the first blockchain network includes obtaining the first data and the first location information from the first blockchain network based on the pre-determined label.

Another aspect of the present specification provides a method for receiving a cross-chain authenticatable message, where receiving a cross-chain authenticatable message refers to receiving the authenticatable message from another system by at least one object in a second system, the second system is connected to a relay, at least one piece of second data that is related to at least one of other blockchain networks is synchronized to the second system by using the relay, the at least one of other blockchain networks includes a first blockchain network, and the method is performed by a second blockchain network and includes: receiving first data and first location information from the relay, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, the first location information indicates a location of the first data in the sending blockchain network, and the receiving object information corresponds to an identifier of the second system and the at least one object; obtaining, based on the identifier of the first blockchain network in the authenticatable message, second data related to the first blockchain network; verifying the authenticatable message based on the first data, the second data related to the first blockchain network, and the first location information; and providing the authenticatable message to the at least one object based on the receiving object information in the authenticatable message.

In an implementation, the first data is a first receipt in a first block in the first blockchain network, the first location information includes a block number of the first block and a receipt number of the first receipt in the first block, the second data related to the first blockchain network includes a block head of each block in the first blockchain network, and verifying the authenticatable message based on the first data, the second data related to the first blockchain network, and the first location information includes: using a simplified payment verification method to verify, based on the first receipt, the block head of each block, and a Merkle tree path that is associated with the first receipt and that is included in the first block, that the first receipt is received from the first block in the first blockchain network, where the Merkle tree path is obtained based on the first location information.

In an implementation, the authenticatable message is included in a first log of the first receipt, and verifying the authenticatable message based on the first data, the second data related to the first blockchain network, and the first location information further includes: verifying, based on a sending field in the first log, that the first account is an account used to send the authenticatable message.

In an implementation, the second system is a second blockchain network, the at least one object is a second account in the second blockchain network, the second account is a contract account of a third smart contract, and providing the authenticatable message to the at least one object includes: invoking the third smart contract by using the authenticatable message as an input parameter, to provide the authenticatable message to the second account.

Another aspect of the present specification provides a method for relaying a cross-chain authenticatable message, where the method is performed by a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; each piece of second data corresponding to each connected blockchain network is synchronized to the relay; and the method includes: obtaining the first data and first location information from the first blockchain network, where the first location information indicates a location of the first data in the first blockchain network; and obtaining, based on the identifier of the first blockchain network in the authenticatable message, second data related to the first blockchain network; verifying the authenticatable message based on the first data, the second data related to the first blockchain network, and the first location information; when the verification succeeds, adding a digital signature on the authenticatable message; and sending, based on the receiving object information in the authenticatable information, the authenticatable message and the digital signature of the authenticatable message to a system in which a receiving object is located, where the relay is connected to the system.

Another aspect of the present specification provides a method for receiving a cross-chain authenticatable message, where receiving a cross-chain authenticatable message refers to receiving the authenticatable message from another system by at least one object in a second system, the second system is connected to a relay, the relay is further connected to a first blockchain network, the second system pre-stores a public key of the relay, and the method is performed by the second system and includes: receiving an authenticatable message and a digital signature of the authenticatable message from the relay, where the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the receiving object information corresponds to an identifier of the second system and the at least one object; verifying the digital signature by using the public key of the relay; and providing the authenticatable message to the at least one object based on the receiving object information in the authenticatable message.

Another aspect of the present specification provides a device for sending a cross-chain authenticatable message, where sending a cross-chain authenticatable message refers to sending the authenticatable message from a first account in a first blockchain network to the outside, the first blockchain network is connected to the relay, and the device is disposed in the first blockchain network and includes: a storing unit, configured to store first data through consensus into the first blockchain network by using the first account, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; and a providing unit, configured to provide the first data and first location information to the relay, to provide the authenticatable message to the receiving object, where the first location information indicates a location of the first data in the first blockchain network, and the relay is connected to a system in which the receiving object is located.

In an implementation, the storing unit is further configured to store the first data into the first blockchain network by invoking a first smart contract by using the first account, where at least the following parameters are input to the first smart contract when the first smart contract is invoked by using the first account: the receiving object information and the message content.

Another aspect of the present specification provides a device for relaying a cross-chain authenticatable message, where the device is disposed at a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; and the device includes: an acquisition unit, configured to obtain the first data and first location information from the first blockchain network, where the first location information indicates a location of the first data in the first blockchain network; and a sending unit, configured to send, based on the receiving object information in the authenticatable information, the first data and the first location information to a system in which a receiving object is located, where the relay is connected to the system.

In an implementation, the first data is labeled with a pre-determined label, and the acquisition unit is further configured to obtain the first data and the first location information from the first blockchain network based on the pre-determined label.

Another aspect of the present specification provides a device for receiving a cross-chain authenticatable message, where receiving a cross-chain authenticatable message refers to receiving the authenticatable message from another system by at least one object in a second system, the second system is connected to a relay, at least one piece of second data that is related to at least one of other blockchain networks is synchronized to the second system by using the relay, the at least one of other blockchain networks includes a first blockchain network, and the device is disposed in a second system and includes: a receiving unit, configured to receive first data and first location information from the relay, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, the first location information indicates a location of the first data in the sending blockchain network, and the receiving object information corresponds to an identifier of the second system and the at least one object; an acquisition unit, configured to obtain, based on the identifier of the first blockchain network in the authenticatable message, second data related to the first blockchain network; a verification unit, configured to verify the authenticatable message based on the first data, the second data related to the first blockchain network, and the first location information; and a providing unit, configured to: after the verification succeeds, provide the authenticatable message to the at least one object based on the receiving object information in the authenticatable message.

In an implementation, the first data is a first receipt in a first block in the first blockchain network, the first location information includes a block number of the first block and a receipt number of the first receipt in the first block, the second data related to the first blockchain network includes a block head of each block in the first blockchain network, and the verification unit is further configured to use a simplified payment verification method to verify, based on the first receipt, the block head of each block, and a Merkle tree path that is associated with the first receipt and that is included in the first block, that the first receipt is received from the first block in the first blockchain network, where the Merkle tree path is obtained based on the first location information.

In an implementation, the authenticatable message is included in a first log of the first receipt, and the verification unit is further configured to verify, based on a sending field in the first log, that the first account is an account used to send the authenticatable message.

In an implementation, the second system is a second blockchain network, the at least one object is a second account in the second blockchain network, the second account is a contract account of a third smart contract, and the providing unit is further configured to invoke the third smart contract by using the authenticatable message as an input parameter, to provide the authenticatable message to the second account.

Another aspect of the present specification provides a device for relaying a cross-chain authenticatable message, where the device is disposed at a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; each piece of second data corresponding to each connected blockchain network is synchronized to the relay; and the device includes: a first acquisition unit, configured to obtain the first data and first location information from the first blockchain network, where the first location information indicates a location of the first data in the first blockchain network; and a second acquisition unit, configured to obtain, based on the identifier of the first blockchain network in the authenticatable message, second data related to the first blockchain network; a verification unit, configured to verify the authenticatable message based on the first data, the second data related to the first blockchain network, and the first location information; and a signing unit, configured to: when the verification succeeds, add a digital signature on the authenticatable message; and a sending unit, configured to send, based on the receiving object information in the authenticatable information, the authenticatable message and the digital signature of the authenticatable message to a system in which a receiving object is located, where the relay is connected to the system.

Another aspect of the present specification provides a device for receiving a cross-chain authenticatable message, where receiving a cross-chain authenticatable message refers to receiving the authenticatable message from another system by at least one object in a second system, the second system is connected to a relay, the relay is further connected to a first blockchain network, the second system pre-stores a public key of the relay, and the device is disposed in the second system and includes: a receiving unit, configured to receive an authenticatable message and a digital signature of the authenticatable message from the relay, where the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; a verification unit, configured to verify the digital signature by using the public key of the relay; and a providing unit, configured to: after the verification succeeds, provide the authenticatable message to the at least one object based on the receiving object information in the authenticatable message.

Another aspect of the present specification provides a computer readable storage medium, where the medium stores a computer program, and when the computer program is executed on a computer, the computer is enabled to perform any one of the previous methods.

Another aspect of the present specification provides a computing device, including a memory and a processor, where the memory stores executable code, and when the processor executes the executable code, any one of the previous methods is implemented.

According to an abstract blockchain network interoperation model in the cross-chain solution provided in the implementations of the present specification, an authenticatable message is designed, so that a message sent from a blockchain network can be verified by another blockchain network to determine a specific blockchain network from which the message is sent and a specific identity entity (account number/contract) from which the message is sent. As such, based on the authenticatable message, cross-chain applications (contracts) can be programmed, so that developers can develop various cross-chain services and applications more easily.

BRIEF DESCRIPTION OF DRAWINGS

To make the implementations of the present specification clearer, the following describes the implementations of the present specification with reference to the accompanying drawings.

DESCRIPTION OF IMPLEMENTATIONS

The following describes the implementations of the present specification with reference to the accompanying drawings.

Figure 1:
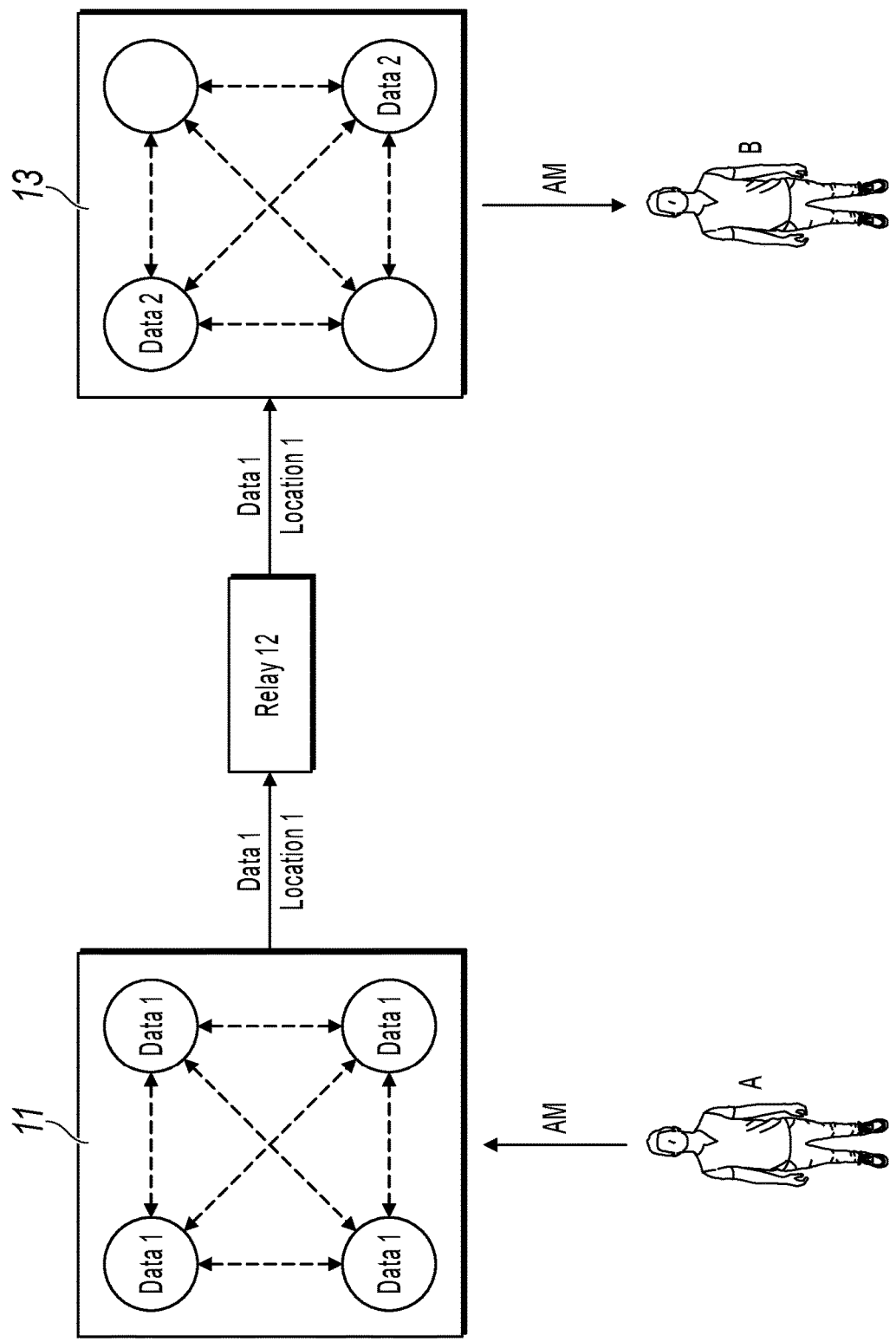
FIG. 1 is a schematic diagram illustrating a cross-chain system, according to an implementation of the present specification.

FIG. 1 is a schematic diagram illustrating a cross-chain system, according to an implementation of the present specification. As shown in FIG. 1, the cross-chain system includes a first blockchain network 11, a relay 12, and a second blockchain network 13. For example, the first blockchain network 11 includes account A, and the second blockchain network 13 includes account B, where both account A and account B can be user accounts or contract accounts. When account A in the first blockchain network needs to send information to account B in the second blockchain network, account A can send the information as an authenticatable message (AM). The authenticatable message is included in first data (data 1) on which consensus processing is performed and that is stored by account A into a blockchain network. For example, the second blockchain network 13 can include a plurality of simplified payment verification (SPV) nodes, and the SPV nodes locally pre-obtain second data (data 2) in the first blockchain network 11, and data 2 is used to verify data 1. Each SPV node can obtain the first data (data 1) and location information of the first data (location 1) through the relay 12 between the first block blockchain network 11 and the second blockchain network 13, and use data 2 to verify data 1, and provides the AM in data 1 to account B after the verification succeeds. Then, account B can perform service processing based on the AM.

It can be understood that the previous description with reference to FIG. 1 is only an example, but is not intended to limit the implementations of the present specification. For example, after obtaining data 1, the relay can verify data 1 based on the pre-obtained data 2 in the first blockchain network, adds a digital signature on data 1, and then sends data 1 and the digital signature to the second blockchain network; and the second blockchain network can verify the digital signature based on a public key of a relay blockchain network, to verify data 1.

The following describes the previous process in detail.

Figure 2:
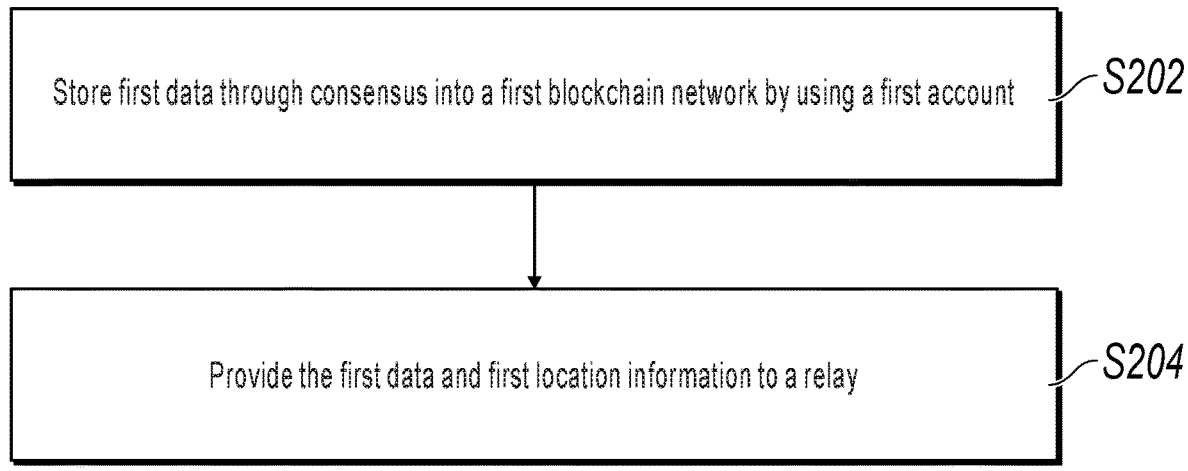
FIG. 2 is a schematic diagram illustrating a method for sending a cross-chain authenticatable message, according to an implementation of the present specification.

FIG. 2 illustrates a method for sending a cross-chain authenticatable message, where sending a cross-chain authenticatable message refers to sending the authenticatable message from a first account in a first blockchain network to the outside, and the first blockchain network is connected to the relay. The method is performed by the first blockchain network and includes:

Step S202: Store first data through consensus into the first blockchain network by using the first account, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account.

Step S204: Provide the first data and first location information to the relay, to provide the authenticatable message to the receiving object, where the first location information indicates a location of the first data in the first blockchain network, and the relay is connected to a system in which the receiving object is located.

In this implementation of the present specification, for example, the receiving object a second account in a second blockchain network, and a system in which the receiving is located is the second blockchain network. The following description is based on the previous example. It can be understood that a second system is not limited to another blockchain network. For example, the second system can alternatively be an off-blockchain channel or an off-blockchain application. The receiving object is not limited to an account, either. For example, the receiving object can alternatively be a group including a plurality of accounts.

The first blockchain network and the second blockchain network can be any blockchain network, for example, bitcoin blockchain network or Ethereum blockchain network. The bitcoin blockchain network and Ethereum blockchain network send messages through an authenticatable message with a unified format. Therefore, this implementation of the present specification does not impose a limitation on a blockchain network type and a specific application scenario. The relay is an intermediate component between the first blockchain network and the second blockchain network. The blockchain network can be in a plurality of forms. For example, the relay can be a node in the first blockchain network and the second blockchain network, that is, the relay has an account in the first blockchain network and an account in the second blockchain network; or the relay is a transfer device between the first blockchain network and the second blockchain network, which only transfers data but does not verify the data; or the relay is a trusted node, which verifies data received from the first blockchain network, and after the verification succeeds, sends the data to the second blockchain network; or the relay can be a verification blockchain network, which performs consensus verification on the data received from the first blockchain network, and then sends the data to the second blockchain network.

In step S202, the first through consensus is stored into the first blockchain network by using the first account, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account.

As described above, receiving object information varies with the receiving object. For example, when the receiving object is a group of accounts in another blockchain network, the receiving object information can include a blockchain identifier of the another blockchain network, a group identifier of the group, and even an account identifier of each account in the group. For example, when the receiving object is a specific object in an off-blockchain channel, the receiving object information can include an identifier of the off-blockchain channel and an identifier of the object. In an implementation, the receiving object is the second account in the second blockchain network, and the receiving object information includes a receiving blockchain identifier (that is, the second blockchain network) and a receiving account (that is, the second account). The following description is based on the previous example.

The first account can be a user account or a contract account. The first data can be any one of the following types of data in a blockchain network: transaction, receipt, state of a state tree, smart contract memory, and relational database. Such data is stored into the blockchain network after being provided with consensus processing by corresponding nodes. Therefore, the data is consistent and authenticatable on each node. A person skilled in the art understands that a transaction can be sent in the blockchain network, and the previous data through consensus can be stored into the blockchain network. The process is not described in detail here for simplicity.

In an implementation, storing first data through consensus into the first blockchain network by using the first account includes: storing the first data into the first blockchain network by invoking a first smart contract by using the first account, where at least the following parameters are input to the first smart contract when the first smart contract is invoked by using the first account: receiving object information (that is, an identifier of the second blockchain network and the second account) and the message content. In an implementation, the first account is a contract account of a second smart contract. For example, the first account transfers parameters to a third smart contract in the second blockchain network by invoking the first smart contract, to implement cross-chain invoking of the third smart contract. The first smart contract is a specific smart contract used to store the first data into the first blockchain network to perform cross-chain transfer of an authenticatable message. For example, the first smart contract can be invoked as a contract used for sending a message (that is, the second smart contract), and when the first smart contract is invoked, at least a receiving blockchain identifier (that is, the identifier of the second blockchain network), a receiving account (that is, the second account), and message content need to be input.

For example, when the first smart contract is being executed, a saving function "Save ( )" is included, and parameters input for the function are parameters input to the first smart contract, that is, the identifier of the second blockchain network, the second account, and the message content. In addition, the saving function obtains an account of the second smart contract that initiates the invocation (that is, the first account), combines the first account, a pre-determined identifier of the first blockchain network, and the input parameters (that is, the identifier of the second blockchain network, the second account, and the message content) into an authenticatable message in a pre-determined format (that is, a pre-determined protocol), and outputs the authenticatable message as a result of the function, so that the result of the function is saved in a corresponding log. The log is included in a transaction receipt of a transaction corresponding to the invocation. After nodes in the first blockchain network perform consensus processing on the transaction receipt, the transaction receipt is stored into a block in the first blockchain network. That is, in this implementation, the first data is the receipt in the blockchain network, and a specific log in the receipt includes the authenticatable message. For example, in a block in the blockchain network, the receipt can be queried by using a contract identifier of the first smart contract as a pre-determined label. In an implementation, a specific topic (name) is specified in the log as a pre-determined label, which can be used to query the log subsequently. It can be understood that when the first data is a receipt, the first data needs to be labeled with the pre-determined label, so that the data can be queried subsequently. However, the first data is not limited to a receipt. For example, the first data can be data stored in a memory in which a smart contract is stored, or can be data stored in a relational database. In this case, the pre-determined label does not need to be labeled, and the first data can be directly obtained from a specific database (or memory).

Figure 3:
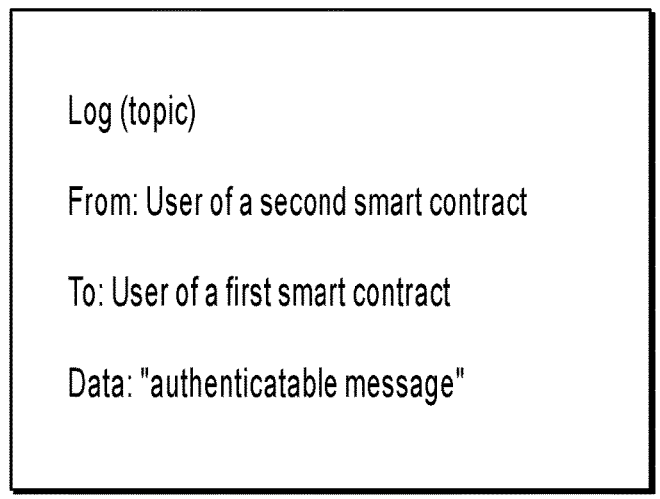
FIG. 3 is a schematic diagram illustrating a log generated after execution of a first smart contract.

For example, after the first smart contract is executed after being invoked based on the second smart contract for execution, a log shown in FIG. 3 is generated. FIG. 3 is a schematic diagram illustrating the log generated after execution of the first smart contract. As shown in FIG. 3, the log includes a pre-determined topic. For example, the topic can be "AM", which is used to indicate whether the log is a log for sending an AM message from a blockchain network to the outside. The log includes the following fields: "To", "From", and "Data". The "To" field corresponds to an account of an invoked contract, that is, an account of the first smart contract. The "From" field corresponds to an account that invokes a contract, that is, an account of the second smart contract (that is, the first account". The "Data" field indicates an authenticatable message that needs to be sent for the second smart contract. The authenticatable message includes at least the following fields that satisfy a pre-determined protocol: a sending blockchain identifier (that is, the identifier of the first blockchain network), a sending account (that is, the contract account of the second smart contract), a receiving blockchain identifier (that is, the identifier of the second blockchain network), a receiving account (that is, a contract account of the third smart contract), and message content (for example, parameters input to the third smart contract).

The pre-determined protocol can be specified according to a specific scenario, and is not limited here. In an implementation, the authenticatable message further includes a protocol version number field and a reserved field. If there are a plurality of protocol versions, a specific protocol version can be determined by using the protocol version number field. The reserved field is an empty field. In an implementation, the authenticatable message can further include a type field used to indicate a usage scenario type of the authenticatable message, so that different message content in different scenarios can be differentiated by the type field. For example, for different usage scenarios (that is, different types of authenticatable messages), the message content field can correspond to different content, different formats, etc. For example, the scenario type is any one of the following types: message type, remote procedure call type, issuance/subscription type, and account transfer. In an implementation, the authenticatable message can further include a sequence number field used to indicate a current sending sequence number when the authenticatable message is sent to a same receiving object for a plurality of times by using the first account. Field values of the protocol version number field, the reserved field, the type field, and the sequence number field can be input, in a similar way, to the first smart contract as input parameters when the first smart contract is invoked by an account, so that the saving function in the first smart contract can output, based on these input parameters, an authenticatable message including the field values.

The previous has described a process in which data through consensus into the first blockchain network based on an example in which the first smart contract is invoked by the second smart contract. However, the implementations of the present specification are not limited thereto. For example, the first account is a user account, and the first account sends a transaction to any one of other accounts, to store first data to a blockchain network. For example, the first data can alternatively be transaction data in a block. For example, a pre-determined label can be specified in a data field of the transaction, to indicate that the transaction is used for sending a cross-chain message, and the data field of the transaction includes the previous authenticatable message. As such, after the first account sends the transaction, and after consensus verification is performed on the transaction, the transaction is stored in to a block. In a subsequent process, the transaction data can be found based on the pre-determined label, and the authenticatable message is obtained from the transaction data.

In step S204, the first data and first location information are provided to the relay, to provide the authenticatable message to the receiving object, where the first location information indicates a location of the first data in the first blockchain network, and the relay is connected to a system in which the receiving object is located.

As described above, in this implementation of the present specification, different types of relays can be used, and the first data can be provided to the relay by using different methods based on different implementations of the relay. For example, when the receiving object is the second account in the second blockchain network, the relay is a node in the first blockchain network and the second blockchain network, so that the relay can obtain the first data from locally stored data (for example, a block or a state tree), and obtain the first location data. The first location data indicates a location of the first data in a blockchain network; for example, when the first data is a receipt, the first location data includes a number of a block in which the receipt is located and a number of the receipt in the block. For example, the relay is a transition device connected to both the first blockchain network and the second blockchain network, so that any node in the first blockchain network can locally obtain the first data and location information of the first data based on a request of the relay, and send the first data and location information of the first data to the relay. After obtaining the first data and location information of the first data, the relay can perform different steps based on a form of the relay, to provide an authenticatable message in the first data to, for example, the second account in the second blockchain network. The process is described in detail below.

Figure 4:
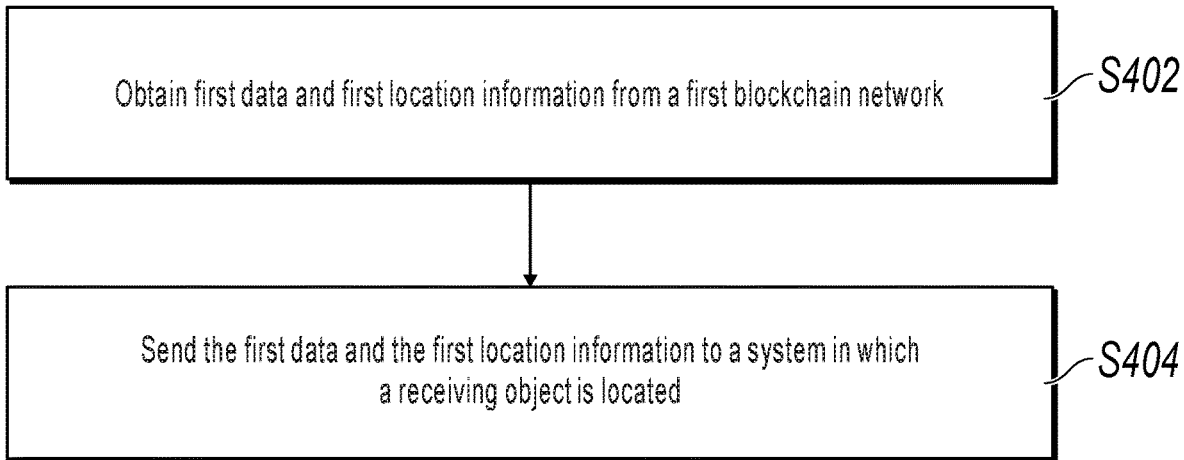
FIG. 4 is a schematic diagram illustrating a method for relaying a cross-chain authenticatable message, according to an implementation of the present specification.

FIG. 4 illustrates a method for relaying a cross-chain authenticatable message, according to an implementation of the present specification provides. The method is performed by a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account. The method includes:

Step S402: Obtain the first data and first location information from the first blockchain network, where the first location information indicates a location of the first data in the first blockchain network.

Step S404: Send, based on the receiving object information in the authenticatable information, the first data and the first location information to a system in which a receiving object is located, where the relay is connected to the system.

After the method shown in FIG. 2 is performed on the first blockchain network, the first data through consensus is stored into the first blockchain network, so that this method can be implemented.

This method is performed by the relay. The steps for performing this method vary with specific implementations of the relay. In this method, for example, the relay is a relay between the first blockchain network and the second blockchain network, that is, the relay only transfers data but does not verify the data, which means that the relay is not responsible for authenticity and integrity of the data.

In step S402, the first data and the first location information are obtained from the first blockchain network, where the first location information indicates a location of the first data in the first blockchain network. In an implementation, the first data with a pre-determined label is stored into a blockchain network, where the pre-determined label is used to query cross-chain data to be sent. For example, the pre-determined label is an account of the first smart contract, and another contract account needs to invoke the first smart contract during cross-chain transfer of information; after the first smart contract is invoked, a corresponding receipt includes the account of the first smart contract. As such, the data can be queried from a blockchain network based on the account of the first smart contract, and the obtained data can be used as the first data, and the identifier of the block in which the data and the number of the receipt in the block can be determined and used as the first location information. For example, the relay can subscribe to any node for a receipt with the account of the first smart contract, to receive the first data and the first location information from the node. As described above, when the first data is specific data, the first data and a storage location of the first data can be obtained from a specific database or memory.

In step S404, the first data and the first location information are sent, based on the receiving object information in the authenticatable information, to a system in which a receiving object is located, where the relay is connected to the system.

As described above, when the receiving object is the second account in the second blockchain network, after receiving the first data and the first location information (for example, the first data is the receipt of the invoked first smart contract), the relay finds a specific log from the receipt based on the account of the first smart contract or a pre-determined topic of a log, and obtains an authenticatable message from a data field in the specific log. Based on a pre-determined protocol, it can be determined that the identifier of the second blockchain network in the authenticatable message is an identifier of a blockchain network that is to receive the authenticatable, so that the first data and the first location information can be sent to the second blockchain network. It can be understood that it is possible that the relay is connected to more than two blockchain networks, for example, it is possible that the relay is further connected to a third blockchain network and a fourth blockchain network. As such, a process in which the relay sends data based on the identifier of the second blockchain network after receiving the first data and the first location information is a process in which the relay addresses a receiving blockchain network based on a receiving blockchain identifier.

Figure 5:
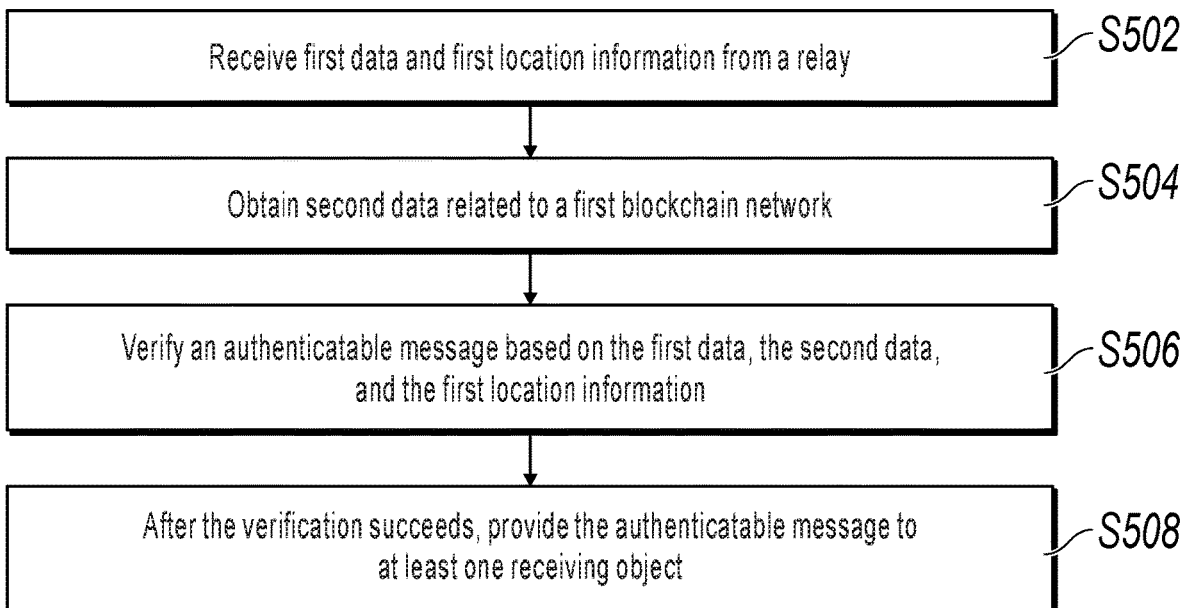
FIG. 5 is a schematic diagram illustrating a method for receiving a cross-chain authenticatable message, according to an implementation of the present specification.

FIG. 5 illustrates a method for receiving a cross-chain authenticatable message, according to an implementation of the present specification. Cross-chain receiving refers to receiving from another system by at least one object in a second system, the second system is connected to a relay, at least one piece of second data that is related to at least one of other blockchain networks is synchronized to the second system by using the relay, and the at least one of other blockchain networks includes a first blockchain network. The method is performed by a second blockchain network and includes:

Step S502: Receive first data and first location information from the relay, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, the first location information indicates a location of the first data in the sending blockchain network, and the receiving object information corresponds to an identifier of the second system and the at least one object.

Step S504: Obtain, based on the identifier of the first blockchain network in the authenticatable message, second data related to the first blockchain network.

Step S506: Verify the authenticatable message based on the first data, the second data related to the first blockchain network, and the first location information.

Step S508: Provide the authenticatable message to the at least one object based on the receiving object information in the authenticatable message.

The relay in the method shown in FIG. 5 corresponds to the relay in the method shown in FIG. 4. The method shown in FIG. 5 can be performed after the method shown in FIG. 4 is performed. As described above, when the receiving object is the second account in the second blockchain network, the receiving object information includes a receiving blockchain identifier and a receiving account that respectively correspond to an identifier of the second blockchain network and a second account in the second blockchain network. For example, a plurality of verification nodes in the second blockchain network verify an authenticatable message, and second data related to each of other blockchain networks is synchronized to the verification nodes through the relay, where the second data is used to verify the authenticatable message. The verification node and the second data vary with the verification method. For example, when verification is performed by using a simplified payment verification (SPV) method, the verification node is an SPV node, and the second data is a block head of each block in a corresponding blockchain network.

First, in step S502, first data and first location information are received from the relay, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, the first location information indicates a location of the first data in the sending blockchain network, and the receiving object information corresponds to an identifier of the second system and the at least one object.

As described above, the first data can be, for example, a receipt with a pre-determined label that is obtained by the relay from a block in the first blockchain network. After receiving the receipt and a location of the receipt, the relay can transfer the receipt and the location of the receipt to the second blockchain network, so that each node in the second blockchain network can obtain the receipt and the location of the receipt, so that an account node or a verification node in the second blockchain network can perform steps S504-S508.

In step S504, second data related to the first blockchain network is obtained based on the identifier of the first blockchain network in the authenticatable message.

As described above, the authenticatable message includes the identifier of the first blockchain network. As such, after the first data is received, the identifier of the first blockchain network can be obtained from the sending blockchain identifier field in the authenticatable message in the first data, so that second data related to the first blockchain network can be obtained locally.

In step S506, the authenticatable message is verified based on the first data, the second data related to the first blockchain network, and the first location information.

In an implementation, the first data is a first receipt in a first block in the first blockchain network, the first location information includes a block number of the first block and a receipt number of the first receipt in the first block, the second data related to the first blockchain network includes a block head of each block in the first blockchain network, and verifying the authenticatable message based on the first data, the second data related to the first blockchain network, and the first location information includes: using a simplified payment verification (SPV) method to verify, based on the first receipt, the block head of each block, and a Merkle tree path that is associated with the first receipt and that is included in the first block, that the first receipt is received from the first block in the first blockchain network, where the Merkle tree path is obtained based on the first location information. The SPV method includes the following steps:

Calculating a receipt hash value of the first receipt.

Calculating a root hash value of the Merkle tree based on the Merkle tree path.

Comparing the root hash value and a root hash value of a receipt in a block head of the first block, to determine whether the first receipt is in the first block.

In an implementation, the SPV verification can further include: after determining that the first receipt is in the first block, verifying, based on the location of the first block, whether the block head of the block is included in a known longest blockchain network, to determine whether consensus processing has been performed on the first block. In an implementation, the blockchain identifier corresponds to a head hash value of a genesis block in the blockchain network, and the SPV verification can further include: verifying, based on the head hash value and the parent hash value in the block head of the first block and the block head of each block, whether the head hash value of the genesis block in the blockchain network corresponds to a blockchain identifier of the first blockchain network.

In an implementation, with reference to the descriptions about FIG. 3, based on a receipt that includes the log shown in FIG. 3 and that is automatically generated after the second smart contract invokes the first smart contract, the first receipt can prove that the first account in the authenticatable message is an account used to send the message.

In an implementation, the first receipt is stored into the blockchain network when a user account (that is, the first account) sends a transaction, and the authenticatable message is input to the transaction data by a user. After the first receipt is generated, the authenticatable message is included in a first log of the first receipt; and in this case, verification can be performed based on a sending field in the first log, to determine whether the first account is an account used to send the authenticatable message.

In step S508, the authenticatable message is provided to the at least one object based on the receiving object information in the authenticatable message.

As described above, when the receiving object is the second account in the second blockchain network, in an implementation, the second smart contract in the first blockchain network invokes the first smart contract to transfer information to the third smart contract in the second blockchain network, to invoke the third smart contract. In this case, the second account is a contract account of the third smart contract, and the authenticatable message is, for example, a parameter input to the third smart contract. In an implementation, providing the authenticatable message to the second account includes: invoking the third smart contract by using the authenticatable message as an input parameter, to provide the authenticatable message to the second account. After the third smart contract is invoked, a specific service process is performed based on the information in the authenticatable message. It can be understood that the second account is not limited to an account of a smart contract. For example, the second account can alternatively be a user account; and in this case, the authenticatable message is provided to the user account by a verification node by using a common blockchain network method (for example, sending a transaction).

Figure 6:
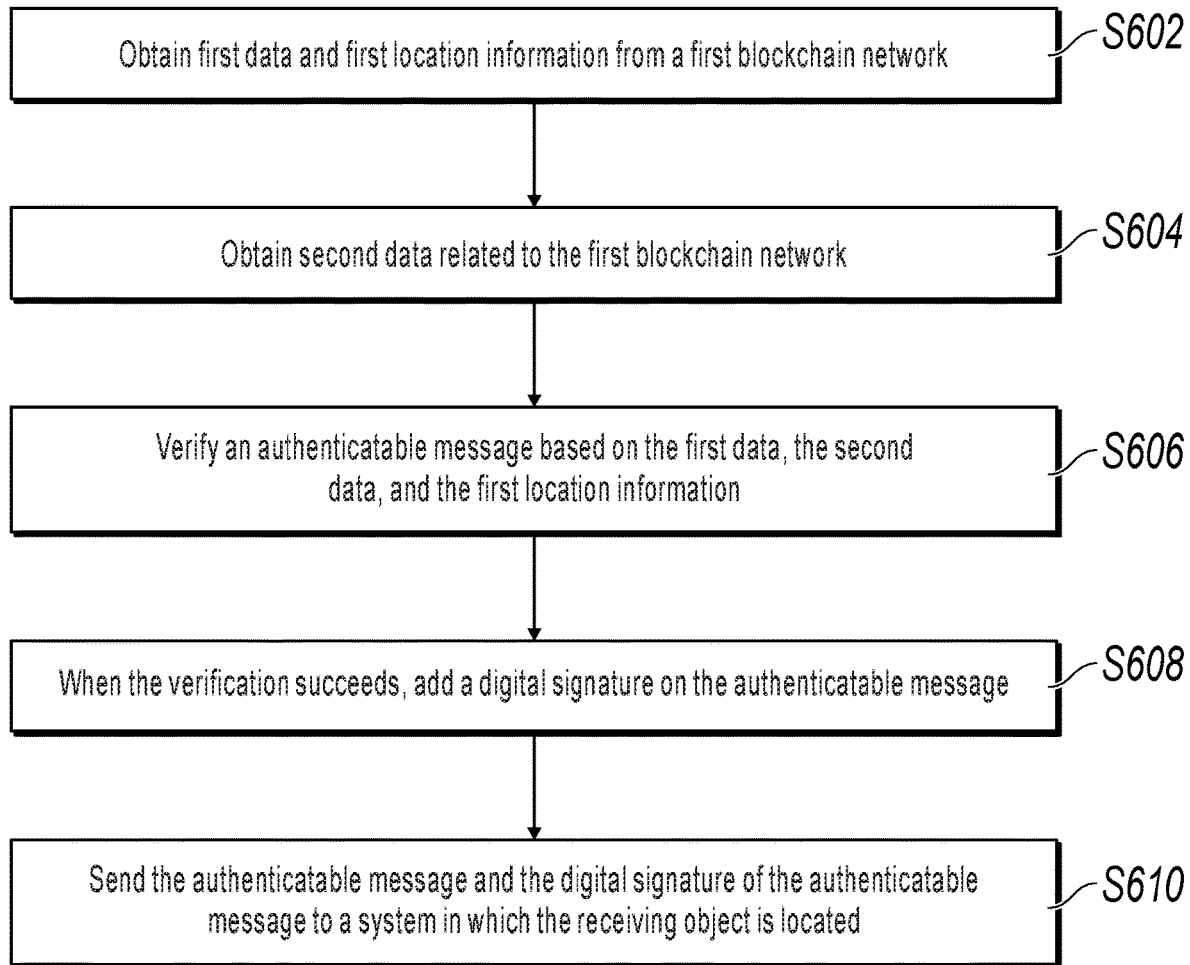
FIG. 6 is a schematic diagram illustrating a method for relaying a cross-chain authenticatable message, according to an implementation of the present specification.

FIG. 6 illustrates a method for relaying a cross-chain authenticatable message, according to an implementation of the present specification. The method is performed by a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; each piece of second data corresponding to each connected blockchain network is synchronized to the relay. The method includes:

Step S602: The first data and the first location information are obtained from the first blockchain network, where the first location information indicates a location of the first data in the first blockchain network.

Step S604: Obtain, based on the identifier of the first blockchain network in the authenticatable message, second data related to the first blockchain network.

Step S606: Verify the authenticatable message based on the first data, the second data related to the first blockchain network, and the first location information.

Step S608: When the verification succeeds, add a digital signature on the authenticatable message.

Step S610: Send, based on the receiving object information in the authenticatable information, the authenticatable message and the digital signature of the authenticatable message to a system in which a receiving object is located, where the relay is connected to the system.

In this method, the relay is a trusted node or a verification blockchain network. After obtaining first data from a first blockchain network, the relay can locally verify the first data. After the verification succeeds, the relay can add a digital signature on the first data, and send the first data and the digital signature to the second blockchain network, so that the second blockchain network can verify the first data based on the digital signature of the relay, thereby simplifying the verification process of the second blockchain network. Steps S602 and S610 in this method correspond to steps S402 and S404 described above. For details about steps S604 and S606, references can be made to the descriptions about steps S504 and S506. Details are omitted here for simplicity.

Figure 7:
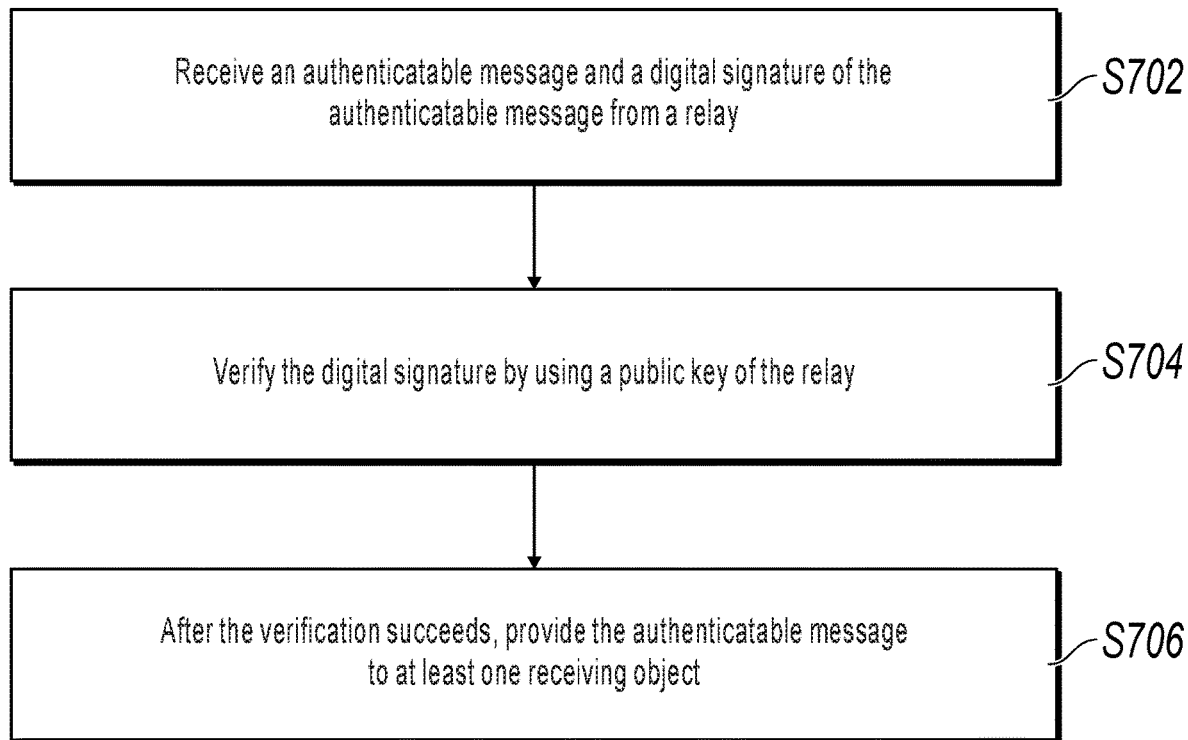
FIG. 7 is a schematic diagram illustrating a method for receiving a cross-chain authenticatable message, according to an implementation of the present specification.

FIG. 7 illustrates a method for receiving a cross-chain authenticatable message, according to an implementation of the present specification. Cross-chain receiving refers to receiving from another system by at least one object in a second system, the second system is connected to a relay, the relay is further connected to a first blockchain network, and the second system pre-stores a public key of the relay. The method is performed by the second system and includes:

Step S702: Receive an authenticatable message and a digital signature of the authenticatable message from the relay, where the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the receiving object information corresponds to an identifier of the second system and the at least one object.

Step S704: Verify the digital signature by using the public key of the relay.

Step S706: Provide the authenticatable message to the at least one object based on the receiving object information in the authenticatable message.

The relay in the method shown in FIG. 7 corresponds to the relay in the method shown in FIG. 6. The method shown in FIG. 7 can be performed after the method shown in FIG. 6 is performed. The method can be performed by any node or client in the second blockchain network. The node (or client) needs to store only a public key of the relay, and then can verify an authenticatable message. As such, the solution shown in FIG. 5 is not needed, in which the first data needs to be received from the relay. Instead, only the authenticatable message needs to be received. For details about step S706, references can be made to the description about step S508. Details are omitted here for simplicity.

Figure 8:
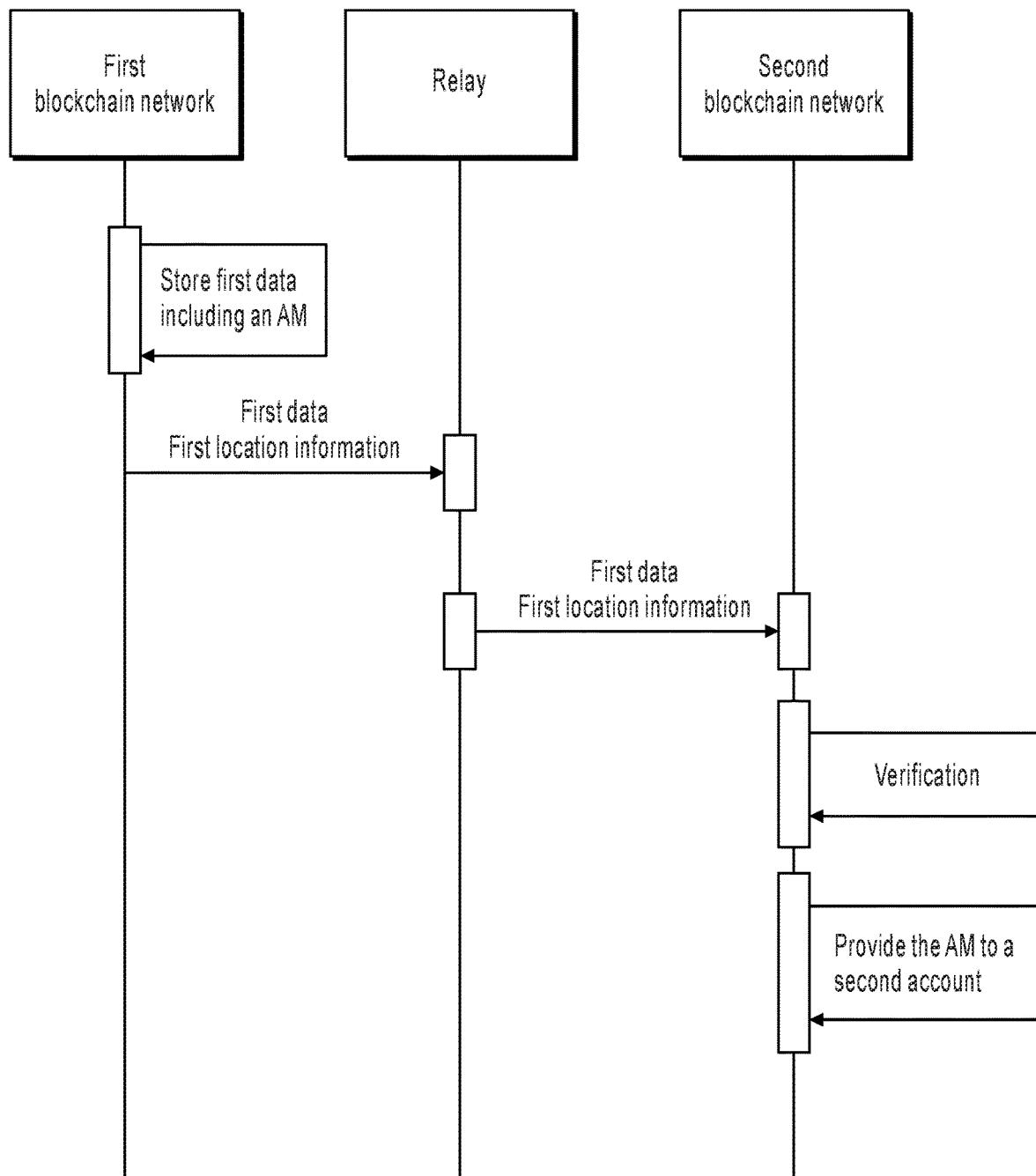
FIG. 8 is a timing diagram for sending an authenticatable message from a first account in a first blockchain network to a second account in a second blockchain network.

FIG. 8 is a timing diagram for sending an authenticatable message from a first account in a first blockchain network to a second account in a second blockchain network. First, in the first blockchain network, the first account stores a first data including an AM message into the first blockchain network, and then the first blockchain network provides the first data and information about a location of the first data in the first blockchain network to a relay. Then, the relay sends the obtained first data and the first location information to the second blockchain network. After obtaining the first data and the first location information, the second blockchain network can verify the first data by using the SPV method. After the verification succeeds, the second blockchain network provides the AM message included in the first data to the second account. The relay in this timing diagram corresponds to the relay shown in FIG. 4 and FIG. 5. Similarly, a person skilled in the art can obtain and use a timing diagram of the relay shown in FIG. 6 and FIG. 7.

Figure 9:
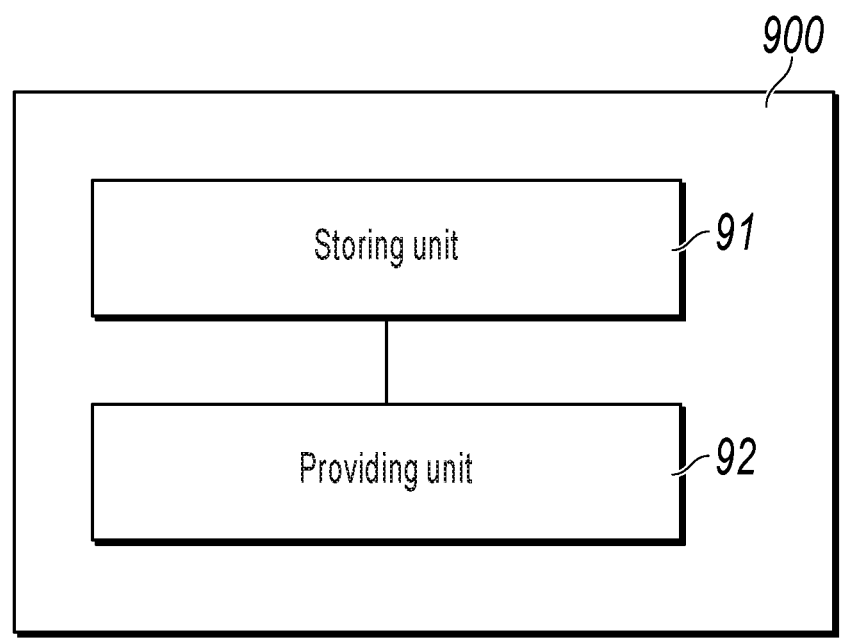
FIG. 9 is a schematic diagram illustrating a device 900 for sending a cross-chain authenticatable message, according to an implementation of the present specification.

FIG. 9 illustrates a device 900 for sending a cross-chain authenticatable message, where sending a cross-chain authenticatable message refers to sending the authenticatable message from a first account in a first blockchain network to the outside, and the first blockchain network is connected to the relay. The method is disposed in the first blockchain network and includes: a storing unit 91, configured to store first data through consensus into the first blockchain network by using the first account, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; and a providing unit 92, configured to provide the first data and first location information to the relay, to provide the authenticatable message to the receiving object, where the first location information indicates a location of the first data in the first blockchain network, and the relay is connected to a system in which the receiving object is located.

In an implementation, the storing unit 91 is further configured to store the first data into the first blockchain network by invoking a first smart contract by using the first account, where at least the following parameters are input to the first smart contract when the first smart contract is invoked by using the first account: the receiving object information and the message content.

Figure 10:
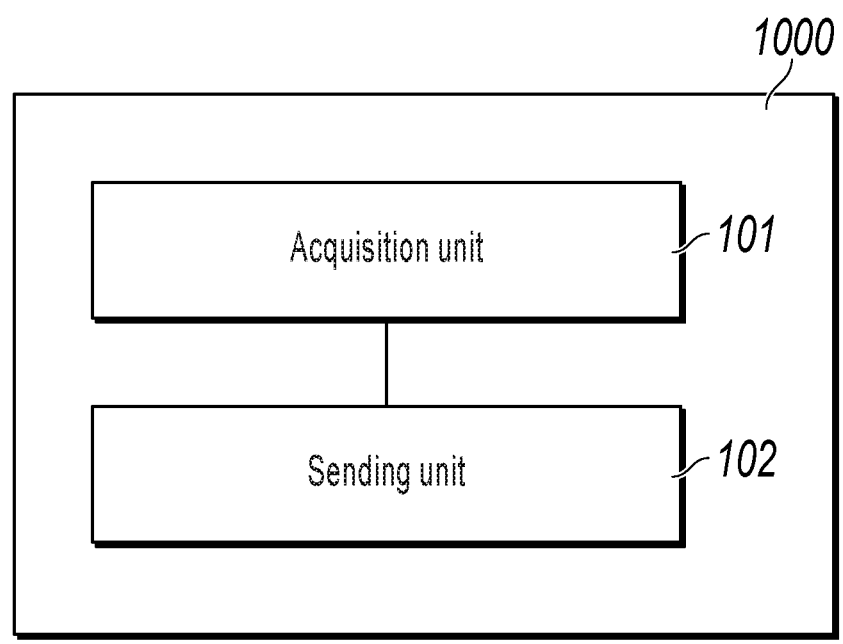
FIG. 10 is a schematic diagram illustrating a device 1000 for relaying a cross-chain authenticatable message, according to an implementation of the present specification.

FIG. 10 illustrates a device 1000 for relaying a cross-chain authenticatable message, according to an implementation of the present specification provides. The device is disposed at a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account. The device includes: an acquisition unit 101, configured to obtain the first data and first location information from the first blockchain network, where the first location information indicates a location of the first data in the first blockchain network; and a sending unit 102, configured to send, based on the receiving object information in the authenticatable information, the first data and the first location information to a system in which a receiving object is located, where the relay is connected to the system.

In an implementation, the first data is labeled with a pre-determined label, and the acquisition unit is further configured to obtain the first data and the first location information from the first blockchain network based on the pre-determined label.

Figure 11:
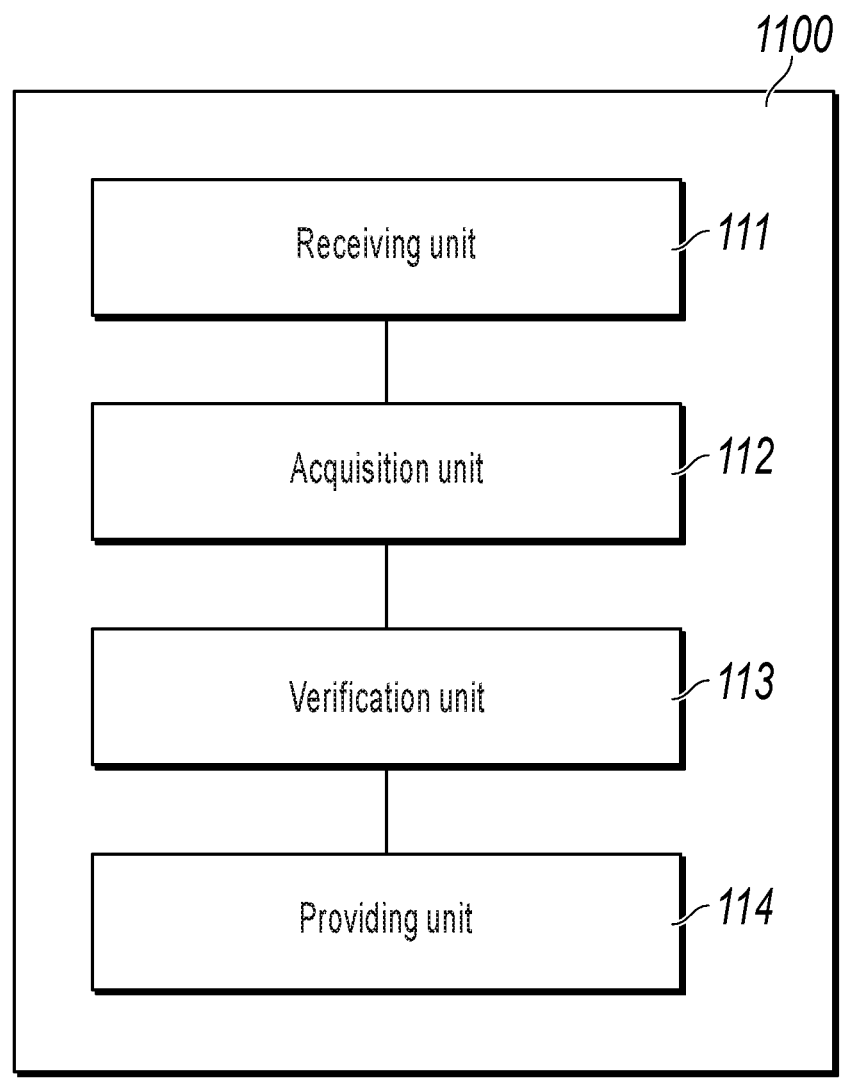
FIG. 11 is a schematic diagram illustrating a device 1100 for receiving a cross-chain authenticatable message, according to an implementation of the present specification.

FIG. 11 illustrates a device 1100 for receiving a cross-chain authenticatable message, according to an implementation of the present specification. Cross-chain receiving refers to receiving from another system by at least one object in a second system, the second system is connected to a relay, at least one piece of second data that is related to at least one of other blockchain networks is synchronized to the second system by using the relay, and the at least one of other blockchain networks includes a first blockchain network. The device is disposed in a second blockchain network and includes: a receiving unit 111, configured to receive first data and first location information from the relay, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, the first location information indicates a location of the first data in the sending blockchain network, and the receiving object information corresponds to an identifier of the second system and the at least one object; an acquisition unit 112, configured to obtain, based on the identifier of the first blockchain network in the authenticatable message, second data related to the first blockchain network; a verification unit 113, configured to verify the authenticatable message based on the first data, the second data related to the first blockchain network, and the first location information; and a providing unit 114, configured to: after the verification succeeds, provide the authenticatable message to the at least one object based on the receiving object information in the authenticatable message.

In an implementation, the first data is a first receipt in a first block in the first blockchain network, the first location information includes a block number of the first block and a receipt number of the first receipt in the first block, the second data related to the first blockchain network includes a block head of each block in the first blockchain network, and the verification unit 113 is further configured to use a simplified payment verification method to verify, based on the first receipt, the block head of each block, and a Merkle tree path that is associated with the first receipt and that is included in the first block, that the first receipt is received from the first block in the first blockchain network, where the Merkle tree path is obtained based on the first location information.

In an implementation, the authenticatable message is included in a first log of the first receipt, and the verification unit 113 is further configured to verify, based on a sending field in the first log, that the first account is an account used to send the authenticatable message.

In an implementation, the second system is a second blockchain network, the at least one object is a second account in the second blockchain network, the second account is a contract account of a third smart contract, and the providing unit 114 is further configured to invoke the third smart contract by using the authenticatable message as an input parameter, to provide the authenticatable message to the second account.

Figure 12:
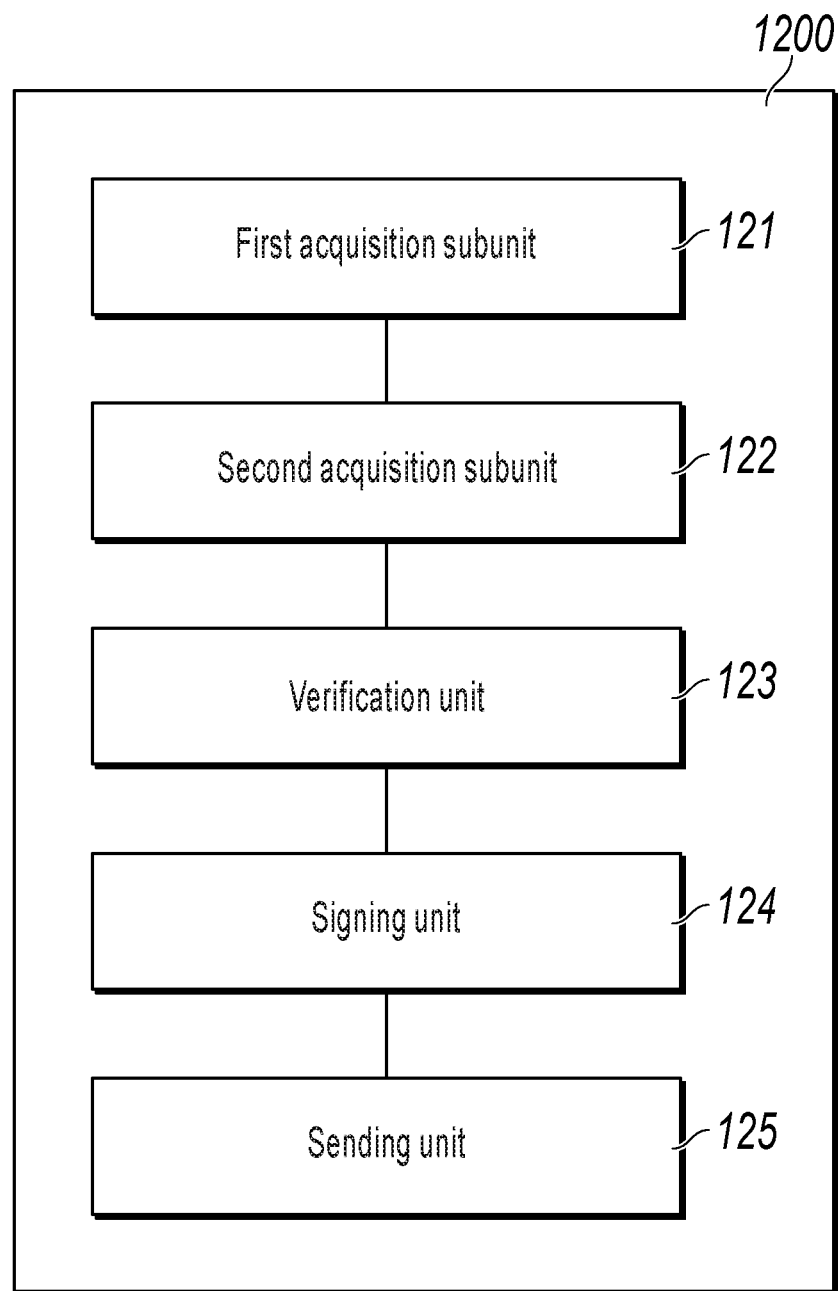
FIG. 12 is a schematic diagram illustrating a device 1200 for relaying a cross-chain authenticatable message, according to an implementation of the present specification.

FIG. 12 illustrates a device 1200 for relaying a cross-chain authenticatable message, according to an implementation of the present specification. The device is disposed at a relay, the relay is connected to a first blockchain network, the first blockchain network pre-stores first data through consensus, the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account; and each piece of second data corresponding to each connected blockchain network is synchronized to the relay. The device includes: a first acquisition unit 121, configured to obtain the first data and first location information from the first blockchain network, where the first location information indicates a location of the first data in the first blockchain network; and a second acquisition unit 122, configured to obtain, based on the identifier of the first blockchain network in the authenticatable message, second data related to the first blockchain network; a verification unit 123, configured to verify the authenticatable message based on the first data, the second data related to the first blockchain network, and the first location information; and a signing unit 124, configured to: when the verification succeeds, add a digital signature on the authenticatable message; and a sending unit 125, configured to send, based on the receiving object information in the authenticatable information, the authenticatable message and the digital signature of the authenticatable message to a system in which a receiving object is located, where the relay is connected to the system.

Figure 13:
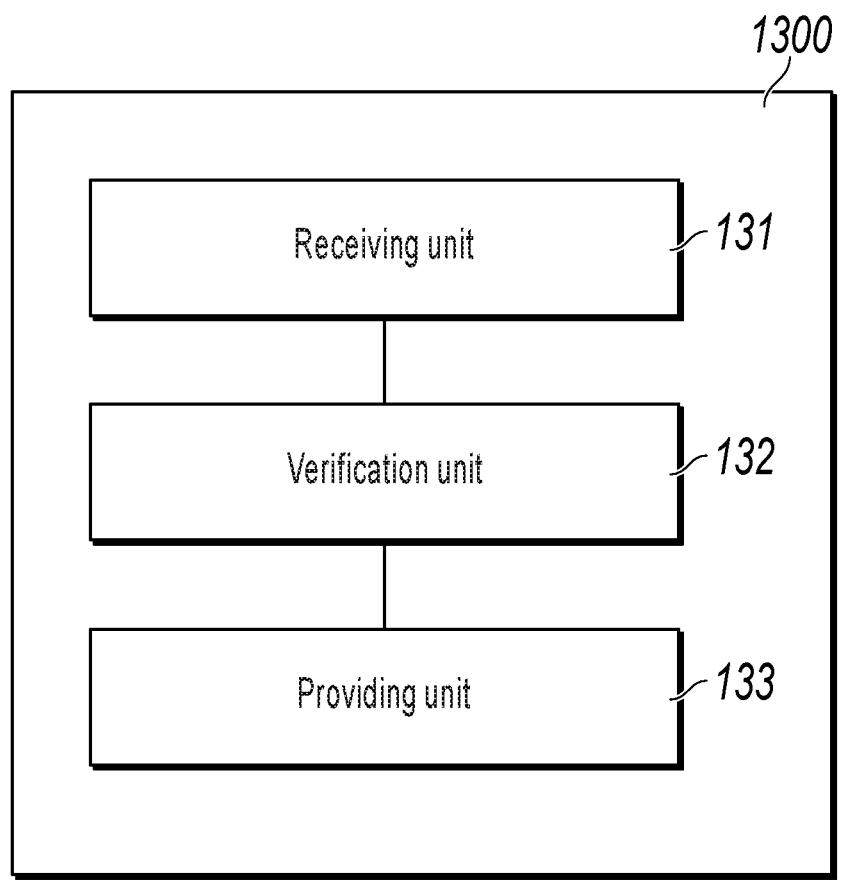
FIG. 13 is a schematic diagram illustrating a device 1300 for receiving a cross-chain authenticatable message, according to an implementation of the present specification.

FIG. 13 illustrates a device 1300 for receiving a cross-chain authenticatable message, according to an implementation of the present specification provides. Cross-chain receiving refers to receiving from another system by at least one object in a second system, the second system is connected to a relay, the relay is further connected to a first blockchain network, and the second system pre-stores a public key of the relay. The device is disposed in the second system and includes: a receiving unit 131, configured to receive an authenticatable message and a digital signature of the authenticatable message from the relay, where the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the receiving object information corresponds to an identifier of the second system and the at least one object; a verification unit 132, configured to verify the digital signature by using the public key of the relay; and a providing unit 133, configured to: after the verification succeeds, provide the authenticatable message to the at least one object based on the receiving object information in the authenticatable message.

Another aspect of the present specification provides a computer readable storage medium, where the medium stores a computer program, and when the computer program is executed on a computer, the computer is enabled to perform any one of the previous methods.

Another aspect of the present specification provides a computing device, including a memory and a processor, where the memory stores executable code, and when the processor executes the executable code, any one of the previous methods is implemented.

According to an abstract blockchain network interoperation model in the cross-chain solution provided in the implementations of the present specification, an authenticatable message is designed, so that a message sent from a blockchain network can be verified by another blockchain network to determine a specific blockchain network from which the message is sent and a specific identity entity (account number/contract) from which the message is sent. As such, based on the authenticatable message, cross-chain applications (contracts) can be programmed, so that developers can develop various cross-chain services and applications more easily. In addition, the authenticatable is highly extensible and supports protocol stacking, so that various cross-chain interoperation technologies and application scenarios can be standardized. Further, the authenticatable message can be implemented on a heterogeneous platform, so that the blockchain network can be easily upgraded to access multiple cross-chain platforms and connect to a plurality of blockchain networks.

It should be understood that terms such as "first" and "second" in the present specification are only used to distinguish between similar concepts for ease of description, and does not impose any other limitation.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

A person of ordinary skill in the art can be further aware that, in combination with the examples described in the implementations disclosed in the present specification, units and algorithm steps can be implemented by electronic hardware, computer software, or a combination thereof. To clearly describe the interchangeability between the hardware and the software, the previous has generally described compositions and steps of each example according to functions. Whether the functions are performed by hardware or software depends on particular applications and design constraint conditions of the technical solutions. A person of ordinary skill the art can use different methods to implement the described functions for each particular application, but it should not be considered that the implementation goes beyond the scope of the present disclosure.

In combination with the implementations disclosed in the present specification, method or algorithm steps can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The objectives, technical solutions, and benefits of the present disclosure are further described in detail in the previous specific implementations. It should be understood that the previous descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A computer-implemented method for sending cross-chain messages comprising:

executing a smart contract that is invoked through a first account of a first blockchain network, wherein the smart contract receives as parameters (i) message content and (ii) information of a recipient of the message content located in a second blockchain network that is outside of the first blockchain network, and wherein executing the smart contract includes combining (i) an identifier of the first account, (ii) an identifier of the first blockchain network, (iii) the message content, and (iv) the information of the recipient of the message content, into an authenticatable message (AM);

saving the AM in a data field of a log that is included in a transaction receipt that corresponds to execution of the smart contract;

after nodes of the first blockchain network have performed consensus processing on the transaction receipt, storing, in a blockchain of the first blockchain network, the transaction receipt that includes the AM; and transmitting the AM and location information to a relay for forwarding to one or more accounts of the recipient of the AM located in the second blockchain network that is outside of the first blockchain network, wherein the relay is communicatively coupled to the first blockchain network and the second blockchain network, wherein the location information identifies a location of the transaction receipt that includes the AM in the blockchain of the first blockchain network, and the recipient of the AM includes one or more accounts of the second blockchain network.

2. The computer-implemented method according to claim 1, wherein storing, in the blockchain of the first blockchain network, the transaction receipt that includes the AM is performed based on the smart contract being invoked through the first account, and wherein the message content and the information of the recipient of the message content are provided by the first account as input to invoke the smart contract.

3. The computer-implemented method according to claim 2, wherein the AM and a corresponding label is included in a blockchain transaction, and wherein the corresponding label identifies the blockchain transaction and that the blockchain transaction is a cross-chain transaction performed between the first account and an account outside of the first blockchain network.

4. The computer-implemented method according to claim 2, wherein the log is generated based on executing the smart contract.

5. The computer-implemented method according to claim 4, wherein the log is associated with a label indicating that the log corresponds to the AM that is transmitted outside of the first blockchain network.

6. The computer-implemented method according to claim 5, wherein the label is an account identifier associated with the smart contract.

7. The computer-implemented method according to claim 2, wherein the smart contract is a first smart contract, and the first account is a contract account associated with a second smart contract.

8. The computer-implemented method according to claim 1, wherein the AM is generated based on a pre-determined protocol, and the AM includes a version number of the pre-determined protocol and a reserved field.

9. The computer-implemented method according to claim 1, wherein the AM includes a type field indicating a type of usage scenario of the AM.

10. The computer-implemented method according to claim 9, wherein the type of usage scenario is one of messaging, remote procedure call, issuance, and subscription.

11. The computer-implemented method according to claim 1, wherein the AM includes a sequence number indicating a relative time-sequence of the AM in a sequence of AMs sent to the recipient.

12. The computer-implemented method according to claim 1, wherein the information of the recipient of the message content comprise an identifier of the second blockchain network and information of a second account associated with the second blockchain network.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
executing a smart contract that is invoked through a first account of a first blockchain network, wherein the smart contract receives as parameters (i) message content and (ii) information of a recipient of the message content located in a second blockchain network that is outside of the first blockchain network, and wherein executing the smart contract includes combining (i) an identifier of the first account, (ii) an identifier of the first blockchain network, (iii) the message content, and (iv) the information of the recipient of the message content, into an authenticatable message (AM);
saving the AM in a data field of a log that is included in a transaction receipt that corresponds to execution of the smart contract;
after nodes of the first blockchain network have performed consensus processing on the transaction receipt, storing, in a blockchain of the first blockchain network, the transaction receipt that includes the AM; and
transmitting the AM and location information to a relay for forwarding to one or more accounts of the recipient of the AM located in the second blockchain network that is outside of the first blockchain network, wherein the relay is communicatively coupled to the first blockchain network and the second blockchain network, wherein the location information identifies a location of the transaction receipt that includes the AM in the blockchain of the first blockchain network, and the recipient of the AM includes one or more accounts of the second blockchain network.

14. The computer-implemented system according to claim 13, wherein storing, in the blockchain of the first blockchain network, the transaction receipt that includes the AM is performed based on the smart contract being invoked through the first account, and wherein the message content and the information of the recipient of the message content are provided by the first account as input to invoke the smart contract.

15. The computer-implemented system according to claim 14, wherein the AM and a corresponding label is included in a blockchain transaction, and wherein the corresponding label identifies the blockchain transaction and that the blockchain transaction is a cross-chain transaction performed between the first account and an account outside of the first blockchain network.

16. The computer-implemented system according to claim 14, wherein the log is generated based on executing the smart contract.

17. The computer-implemented system according to claim 16, wherein the log is associated with a label indicating that the log corresponds to the AM that is transmitted outside of the first blockchain network.

18. The computer-implemented system according to claim 17, wherein the label is an account identifier associated with the smart contract.

19. The computer-implemented system according to claim 14, wherein the smart contract is a first smart contract, and the first account is a contract account associated with a second smart contract.

20. The computer-implemented system according to claim 13, wherein the AM is generated based on a pre-determined protocol, and the AM includes a version number of the pre-determined protocol and a reserved field.

21. The computer-implemented system according to claim 13, wherein the AM includes a type field indicating a type of usage scenario of the AM.

22. The computer-implemented system according to claim 21, wherein the type of usage scenario is one of messaging, remote procedure call, issuance, and subscription.

23. The computer-implemented system according to claim 13, wherein the AM includes a sequence number indicating a relative time-sequence of the AM in a sequence of AMs sent to the recipient.

24. The computer-implemented system according to claim 13, wherein the information of the recipient of the message content comprise an identifier of the second blockchain network and information of a second account associated with the second blockchain network.

25. A non-transitory, computer-readable medium storing one or more instructions executable by a computer system to perform operations comprising:
executing a smart contract that is invoked through a first account of a first blockchain network, wherein the smart contract receives as parameters (i) message content and (ii) information of a recipient of the message content located in a second blockchain network that is outside of the first blockchain network, and wherein executing the smart contract includes combining (i) an identifier of the first account, (ii) an identifier of the first blockchain network, (iii) the message content, and (iv) the information of the recipient of the message content, into an authenticatable message (AM);
saving the AM in a data field of a log that is included in a transaction receipt that corresponds to execution of the smart contract;
after nodes of the first blockchain network have performed consensus processing on the transaction receipt, storing, in a blockchain of the first blockchain network, the transaction receipt that includes the AM; and
transmitting the AM and location information to a relay for forwarding to one or more accounts of the recipient of the AM located in the second blockchain network that is outside of the first blockchain network, wherein the relay is communicatively coupled to the first blockchain network and the second blockchain network, wherein the location information identifies a location of the transaction receipt that includes the AM in the blockchain of the first blockchain network, and the recipient of the AM includes one or more accounts of the second blockchain network.

26. The non-transitory, computer-readable medium of claim 25, wherein storing, in the blockchain of the first blockchain network, the transaction receipt that includes the AM is performed based on the smart contract being invoked through the first account, and wherein the message content and the information of the recipient of the message content are provided by the first account as input to invoke the smart contract.

27. The non-transitory, computer-readable medium of claim 26, wherein the AM and a corresponding label is included in a blockchain transaction, and wherein the corresponding label identifies the blockchain transaction and that the blockchain transaction is a cross-chain transaction performed between the first account and an account outside of the first blockchain network.

28. The non-transitory, computer-readable medium of claim 26, wherein the log is generated based on executing the smart contract.

29. The non-transitory, computer-readable medium of claim 28, wherein the log is associated with a label indicating that the log corresponds to the AM that is transmitted outside of the first blockchain network.

30. The non-transitory, computer-readable medium of claim 29, wherein the label is an account identifier associated with the smart contract.

* * * * *